United States Patent [19]
Faulbecker

[11] 3,807,195
[45] Apr. 30, 1974

[54] LUBRICANT SEALS FOR TORQUE-TRANSMITTING JOINTS

[75] Inventor: Gerd Faulbecker, Essen-Steele, Germany

[73] Assignee: Gelenkwellenbau GmbH, Essen, Germany

[22] Filed: May 9, 1972

[21] Appl. No.: 251,830

[30] Foreign Application Priority Data
May 11, 1972 Germany............................ 2123286

[52] U.S. Cl. ........................ 64/32 F, 64/21, 74/18.1, 277/212
[51] Int. Cl. ............................................. F16d 3/84
[58] Field of Search .................... 64/32 F, 32 R, 21; 74/18.1; 277/212

[56] References Cited
UNITED STATES PATENTS

| | | |
|---|---|---|
| 1,117,961 | 11/1914 | Phillips ............................. 64/32 F |
| 2,426,701 | 9/1947 | Miller, Jr. ............................ 64/32 F |
| 2,579,356 | 12/1951 | Anderson ................................ 64/21 |
| 3,204,229 | 9/1965 | Kayser .................................... 64/21 |

*Primary Examiner*—Benjamin W. Wyche
*Assistant Examiner*—Randall Heald
*Attorney, Agent, or Firm*—Karl W. Flocks

[57] ABSTRACT

Seal arrangement for a torque-transmitting joint comprising a boot with a large diameter end secured to a first joint member and a smaller diameter end secured to a second joint member. The said boot including a curvate portion adjacent said large diameter end and being supported against an inner surface of said first joint member, or a part joined thereto, by an elastic retaining ring the inner surface of which is mated with a correspondingly shaped outer surface of the boot in sealing relationship and held in place by an axial load.

8 Claims, 4 Drawing Figures

LUBRICANT SEALS FOR TORQUE-TRANSMITTING JOINTS

The invention refers to a lubricant seal for a torque-transmitting joint, particularly for a constant velocity universal joint which includes provision for relative axial movement between the joint members comprising a boot having a larger diameter end portion fastened to a first joint member and a smaller diameter end portion fastened to a second joint member, the boot including a curvate portion adjacent to the end thereof having the larger diameter.

In a known form of such seal, in order to give a long useful life to such a seal that portion of the boot disposed radially outwardly of the liquid surface of the lubricant ring formed during operation of the joint is retained in shape by a rigid part in such a way that the flexible curvate portion of the boot is located radially within this liquid surface. In one embodiment, the rigid part may be a ring vulcanized or bonded to the boot and fixed to the joint member connected to a first shaft. The rigid part may extend radially at least with its main portion, so that it supports that part of the boot located outside the liquid surface against any axially outward curving. The boot, which has an axially-externally located cylindrical region, is turned up around an axial annular flange of the boot holder with the said region and is fastened on top of the holder with a spring clip. In a majority of applications, the part of the ring which extends radially restricts the flexibility of the joint in an undesirable manner.

An object of the invention is to produce a seal of the kind mentioned above which is simpler and less expensive to manufacture, with which at least as long a life is attainable as with the known form of seal referred to but with which the radial support and the costly fastening of the boot to the holder is avoided.

According to the invention, a seal of the type mentioned above is so designed that the boot is supported against an inner peripheral surface of the joint member, or a part joined to it, by an elastic retaining ring the inner peripheral surface of which has sealing engagement with a correspondingly shaped outer peripheral surface of the boot and which is held in sealing manner under an applied initial stress or axial load against a shoulder of the first joint member or the part joined to it.

According to a preferred further development of the invention, the end of the boot with the larger diameter is supported by a generally cylindrical housing or holder disposed radially outside the liquid surface of the lubricant ring formed during operation on the joint member arranged on the first shaft in order to support effectively the boot in this region which is particularly susceptible to an axial outward curving of the boot as a result of the centrifugal pressure of the lubricant.

Although the seal or boot of the invention does not include a ring with a radially extending part providing axial support for the boot — the shoulder does not fulfill this function but serves only to seal the boot and to fix it axially — it has been shown surprisingly that the boot, clearly on the basis of its firm engagement with the elastic retaining ring, particularly in its region outside the liquid surface, is so stiffened that it resists axial outward curving even better than the known boot. As a result of the omission of the radially extending retaining ring as well as the clip fixing, construction and fitting of the boot according to the invention is simplified as compared with the known boot.

Preferably the boot is provided with a lip protruding from its external peripheral surface which lip is clamped between the shoulder of the holder and the associated end of the retaining ring. The lip gripped between the shoulder and the retaining ring makes a special packing ring or other means of packing superfluous at this point.

The retaining ring, as its mounting on the holder, may have a collar projecting radially from its external peripheral surface which collar is held under an applied initial stress or axial load in a peripheral groove on the inner periphery of the holder. During fitting, the retaining ring is inserted into the holder from the end located on a side of the shoulder and the collar snaps resiliently into the peripheral groove. The collar and peripheral groove can be arranged away from the shoulder; alternatively the peripheral groove may receive both the radial lip of the boot and the collar on the retaining ring. In this case, it is arranged adjacent to the shoulder and has a correspondingly greater width. The retaining ring may consist of an elastic synthetic plastic material. In this case, the sealing connection with the boot is effected in practice by vulcanizing.

BRIEF DESCRIPTION OF THE DRAWINGS

Several embodiments of the invention will now be described with reference to the accompanying drawings in which.

Figure 1:
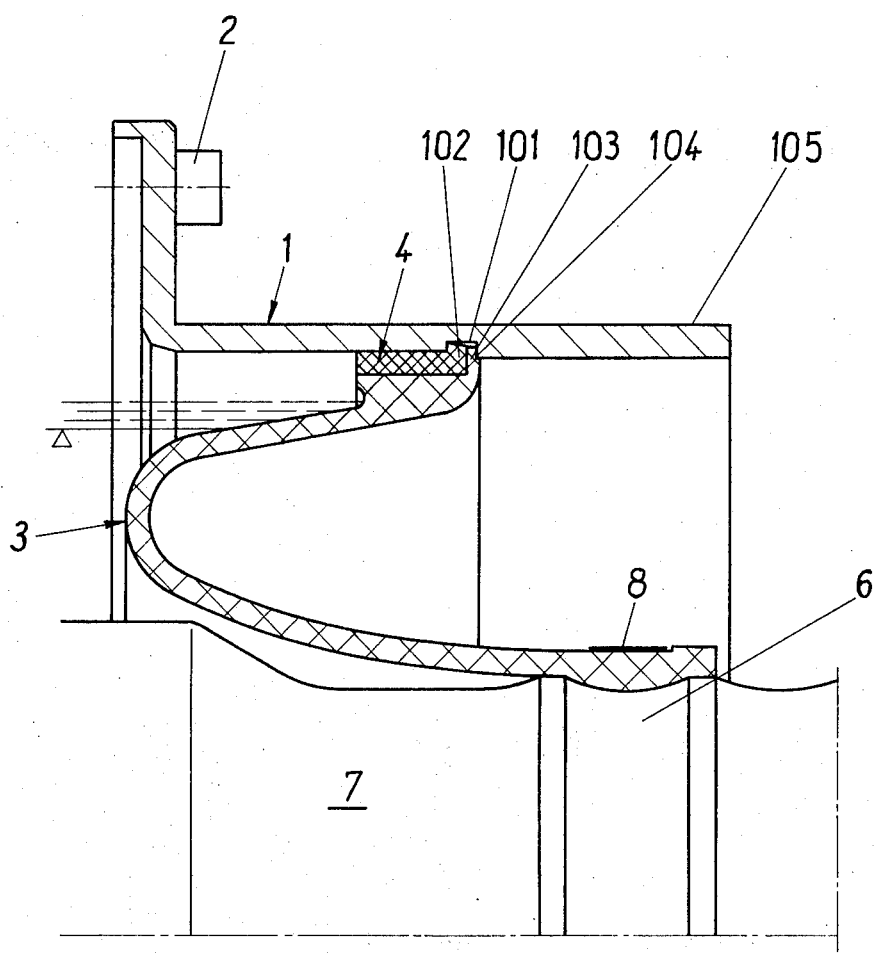
FIGS. 1 to 4 are axial half-sections through four forms of seal in accordance with the invention.
Figure 2:
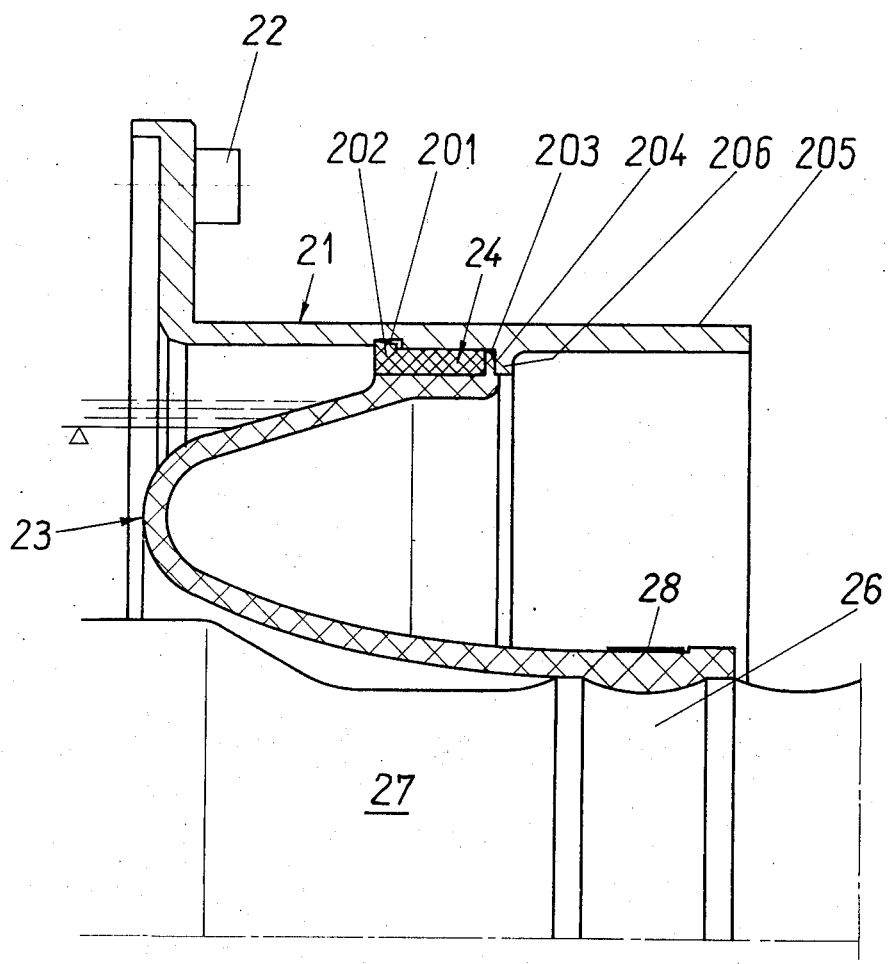
Figure 3:
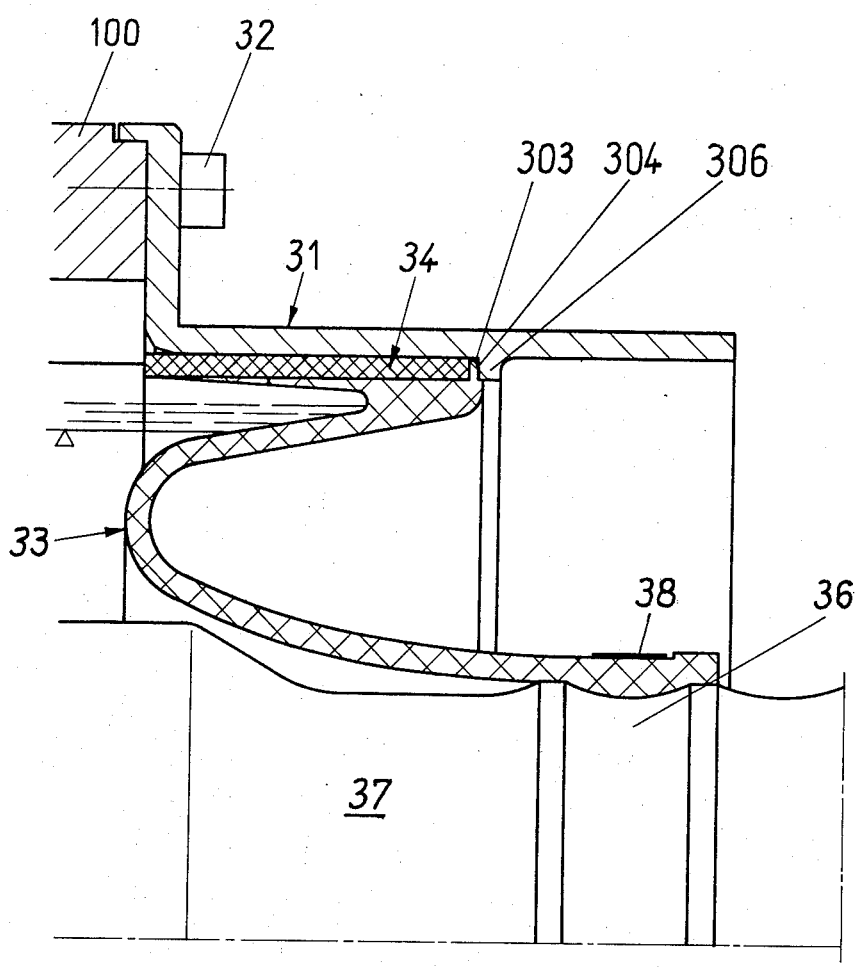
Figure 4:
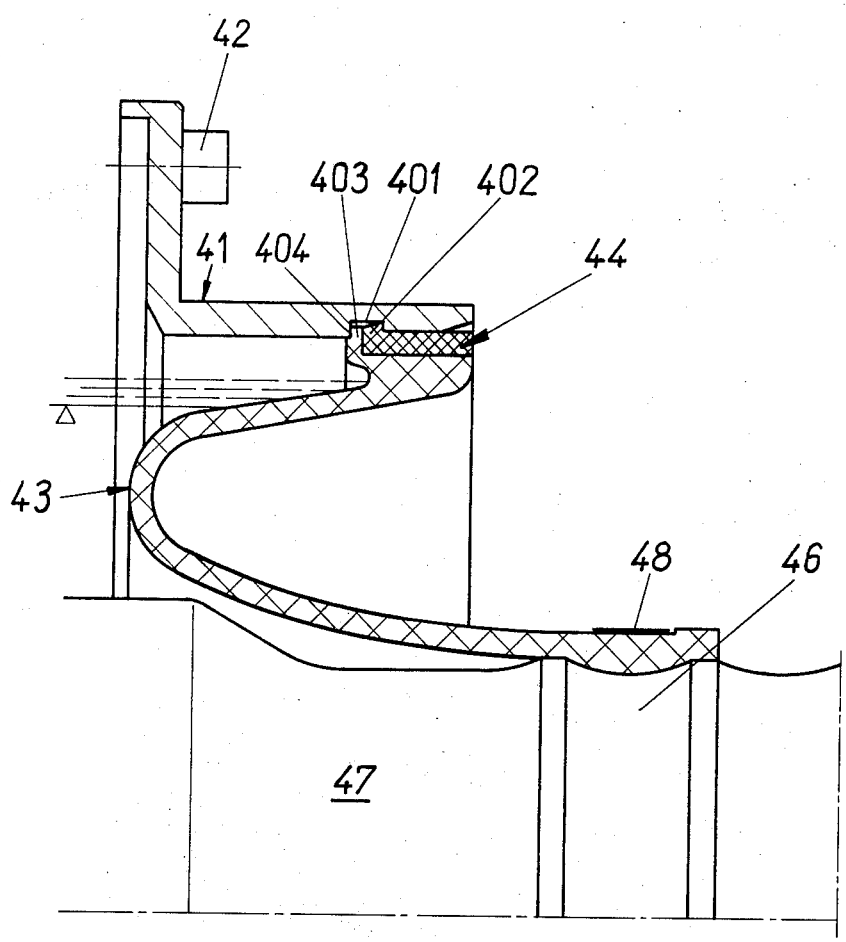

The seal shown in FIGS. 1 to 4 consists essentially of the boot holder 1, 21, 31, 41 which is joined to the outer joint member 100, shown only in FIG. 3, by means of the screws 2, 22, 32, 42, as well as a boot 3, 23, 33, 43, which seals the moving parts of the joint whereby they are maintained in a lubricated state to allow free articulation, and, if required, axial movement of the joint members. The boot 3, 23, 33, 43 is externally radially reinforced by a plastics retaining ring 4, 24, 34, 44 vulcanized to the essentially cylindrically shaped outer surface of the boot, the boot also engaging by means of the ring the inner peripheral surface of the axially extending section of holder 1, 21, 31, 41. The smaller diameter, radially inwardly disposed end portion of the boot is held by means of a clip 8, 28, 38, 48 in a peripheral groove 6, 26, 36, 46 of a shaft 7, 27, 37, 47 which is connected to the second member of the joint. In the flexible region of the boot, between the radially inner and outer ends thereof, the boot in cross-section is curved in a V-shape with the apex of the V directed towards the interior of the joint.

The embodiment of FIGS. 1, 2, 3 and 4 differ essentially from one another in the method of mounting the retaining ring with the boot firmly bonded to it on the inner periphery of the axially extending annular section of the holder 1.

In the embodiment shown in FIG. 1, the holder 1 has an inwardly facing peripheral groove 101 located approximately at the center of its axially extending annular section and the groove 101 receives a collar 102 located at the end of the retaining ring remote from the interior of the joint as well as a lip 103 projecting radially outwardly from the end of the boot which collar and lip are received under axial initial stress. The lip 103 is pressed against a shoulder 104 at the inner end of a section 105 of the holder 1 which serves as a protective shield and extends parallel to the shaft 7 when the joint members are aligned. The section 105 has an external diameter equal to that of the remaining axial annular part of the holder 1 but a somewhat smaller internal diameter and thus a somewhat greater wall strength.

In the embodiment shown in FIG. 2, the holder 21 likewise includes an intermediate axially extending section with a peripheral inwardly facing groove 201 which is, however, narrower than that of the embodiment shown in FIG. 1. The peripheral groove 201 only receives a collar 202 which in this case is arranged at the end of the retaining ring 24 adjacent the interior of the joint. The other end portion of the retaining ring 24 clamps a radial lip 203 of the boot to a shoulder 204 facing inwardly of the joint, the shoulder being afforded by one side of a rib 206 which projects radially inwardly from the radially extending section of holder 1. On the other side of the rib 206, the holder 21 includes an extension section 205 serving as a protective shield.

The holder 31 of the embodiment shown in FIG. 3 has, like the embodiment of FIG. 2, a radially inwardly projecting rib 306 with a shoulder 304 facing towards the interior of the joint and against which a lip 303 projecting radially from the outer end of the boot is held by the retaining ring 34. As distinct from the embodiments of FIGS. 1 and 2, however, the retaining ring 34 has no collar engaging in an inner peripheral groove of the holder but the ring, which throughout is shaped cylindrically, is supported axially by the first joint member 100 and shoulder 306. In this embodiment, the retaining ring 34 is substantially longer than in the embodiments shown in FIGS. 1 and 2. Essentially, however, that part of the boot connected to the retaining ring includes a support region the axial and radial dimensions of which correspond to the corresponding part of the boots of FIGS. 1 and 2 so that the three boots do not differ substantially as regards their rigidity in the region outside the surface of the liquid.

In FIG. 3 the holder 31 is extended beyond the rib 306 to provide a protective shield 305. The holder 41 in FIG. 4 does not include such a protective shield and is, therefore, intended for use under conditions in which the joint is protected and the seal differs in general from the embodiment of FIG. 1 only in that the collar 402 of the retaining ring 44 is located at the end of the ring adjacent the interior of the joint. Thus, in the embodiment in FIG. 4 both the collar 402 and the lip 403 are contained under an axial load or compressive stress in a common peripheral groove 401 formed in and facing inwardly of the holder 41.

To assemble the seal of FIG. 1, the ring 4 is bonded to the boot 3, as by vulcanizing, and the ring 4 with its outwardly projecting collar 102 is inserted into the inner end of the holder 1, being compressed radially inwardly during such insertion. The ring 4 is moved along the bore of the holder 1 until the collar 102 registers with the groove 101 whereupon the collar moves resiliently outwardly whereby it enters the groove 101 together with the lip 103 of the boot. The combined axial dimensions of the lip and collar in their free unstressed state are greater than the axial dimension of the groove 101 and thus, as the boot is of a more easily deformable material than the ring, the lip 103 is compressed axially and is axially loaded against the shoulder 104. The ring 4 thus not only supports the outermost portion of the boot against excessive deformation but also insures that a lubricant-tight enclosure is defined around the joint members. The methods of assembly of the seals of FIGS. 2 to 4 will be readily apparent from the above.

It will be obvious to those skilled in the art that various changes may be made without departing from the scope of the invention and the invention is not to be considered limited to what is shown in the drawings and described in the specification.

What is claimed is:

1. A lubricant seal for a torque-transmitting joint comprising
   first and second joint members,
   a holder with an abutment thereon and fastened to said first joint member and located radially outside the liquid surface of the lubricant ring formed during operation of the joint,
   a boot having a larger diameter end portion fastened to said holder and a smaller diameter end portion fastened to said second joint member,
   said boot including a curvate portion adjacent the end thereof having the larger diameter,
   a retaining ring of a different material more rigid than the material comprising said boot supporting said boot against an inner surface of said holder,
   said ring having an inner surface in sealing engagement with a correspondingly shaped outer surface of said boot and held under an applied axial load in sealing manner against said abutment on said holder.

2. A seal as claimed in claim 1, further characterized by
   said boot having a lip protruding radially from its outer surface and clamped between said abutment and an associated end of said retaining ring.

3. A seal as claimed in claim 2, further characterized by
   said holder having an inwardly facing peripheral groove,
   said retaining ring having a collar projecting radially from its outer surface,
   said collar locked in said peripheral groove.

4. A seal as claimed in claim 3, further characterized by
   said radial lip of said boot also received in said peripheral groove.

5. A seal as claimed in claim 1, further characterized by
   the end of said retaining ring remote from said abutment abutting a part of said first joint member.

6. A seal as claimed in claim 1, further characterized by
   the material of said retaining ring being a synthetic plastic.

7. A seal as claimed in claim 1, further characterized by
   said retaining ring secured to said outer surface of said boot by vulcanizing.

8. A seal as claimed in claim 1, further characterized by
   said holder extending outwardly beyond said abutment to afford a protective shield.

* * * * *